(12) United States Patent
Ponzio

(10) Patent No.: US 9,306,438 B2
(45) Date of Patent: Apr. 5, 2016

(54) APPARATUS FOR THE MOVEMENT OF WIRE DISPENSING MEMBERS USED FOR WINDING COILS OF CORE COMPONENTS OF DYNAMOELECTRIC MACHINES

(75) Inventor: Massimo Ponzio, Florence (IT)

(73) Assignee: ATOP S.p.A., Florence (IT)

( * ) Notice: Subject to any disclaimer, the term of this patent is extended or adjusted under 35 U.S.C. 154(b) by 507 days.

(21) Appl. No.: 13/883,726

(22) PCT Filed: Nov. 22, 2011

(86) PCT No.: PCT/IB2011/002791
§ 371 (c)(1),
(2), (4) Date: May 6, 2013

(87) PCT Pub. No.: WO2012/069911
PCT Pub. Date: May 31, 2012

(65) Prior Publication Data
US 2013/0233436 A1    Sep. 12, 2013

(30) Foreign Application Priority Data

Nov. 23, 2010 (IT) .............................. TO2010A0926

(51) Int. Cl.
*H02K 15/085* (2006.01)
*H02K 15/04* (2006.01)
*H02K 15/095* (2006.01)

(52) U.S. Cl.
CPC .......... *H02K 15/0435* (2013.01); *H02K 15/095* (2013.01)

(58) Field of Classification Search
CPC .. H02K 15/043; H02K 15/045; H02K 15/095
See application file for complete search history.

(56) References Cited

U.S. PATENT DOCUMENTS

| 4,858,835 A | * | 8/1989 | Luciani | ................ H02K 15/095 242/432.4 |
| 4,991,782 A | * | 2/1991 | Luciani | ................ H02K 15/095 242/432.4 |

(Continued)

FOREIGN PATENT DOCUMENTS

| CA | 2 357 631 | 3/2002 |
| EP | 0 318 063 | 5/1989 |

(Continued)

OTHER PUBLICATIONS

International Search Report dated Jan. 27, 2012 for PCT/IB2011/002791.

*Primary Examiner* — Emmanuel M Marcelo
(74) *Attorney, Agent, or Firm* — Ropes & Gray LLP

(57) ABSTRACT

An apparatus for moving wire dispensing members used to wind dynamo electric machine coils comprising a frame; a first tubular member having a longitudinal axis assembled for longitudinal reciprocation parallel to said longitudinal axis; a second tubular member assembled for longitudinal reciprocation and rotational oscillation; means for generating the translational reciprocation motion of said first and second tubular members; means for generating rotational oscillation of said first and second tubular members; means for generating a relative rotational motion between the first and second tubular members for accomplishing a radial motion of the wire dispensing members; wherein the means for generating the translational reciprocation motion are assembled on a first shaft and the means for generating rotational oscillation are supported for the rotational oscillation with support means assembled on the frame, and the means for generating the rotational oscillation derive rotational motion from the first shaft through a transmission joint.

15 Claims, 5 Drawing Sheets

(56) References Cited

U.S. PATENT DOCUMENTS

| | | | |
|---|---|---|---|
| 5,528,822 A * | 6/1996 | Ponzio | H02K 3/522 242/432 |
| 5,833,166 A * | 11/1998 | Newman | H02K 15/0056 242/432.4 |
| 6,032,897 A | 3/2000 | Ponzio | |
| 6,098,912 A * | 8/2000 | Noji | H02K 15/0075 242/432.5 |
| 2001/0047580 A1 * | 12/2001 | Stratico | H02K 15/0056 29/596 |
| 2002/0043582 A1 * | 4/2002 | Stratico | H02K 15/095 242/433.4 |
| 2003/0011271 A1 * | 1/2003 | Takano | H02K 3/522 310/254.1 |
| 2009/0261194 A1 * | 10/2009 | Naitou | H02K 15/095 242/432 |

FOREIGN PATENT DOCUMENTS

| | | |
|---|---|---|
| EP | 0 538 905 | 4/1993 |
| EP | 1 191 672 | 3/2002 |

* cited by examiner

APPARATUS FOR THE MOVEMENT OF WIRE DISPENSING MEMBERS USED FOR WINDING COILS OF CORE COMPONENTS OF DYNAMOELECTRIC MACHINES

BACKGROUND OF THE INVENTION

The present invention relates to solutions for winding coils of core components of dynamoelectric machines, and more particularly to apparatuses for winding stator cores, like those employed in brushless motors.

Although the invention is particularly described with reference to stator cores, the principles of the invention are equally applied to other cores that need to be wound with wire conductor.

With brushless motors it is known to use cores having wire coils wound by moving one or more needles to dispense tensioned wire. To form a coil having a plurality of turns the wire exits the moving needles and becomes appropriately positioned in the core. The needles move for a predetermined number of cycles to generate a certain number of complete turns, which form the finished wound coils.

The cycle accomplished by a needle is normally a combination of reciprocating translations, reciprocating rotations and incremental radial movements, as described for example in publication EP 1191672.

Schematically, a turn of a coil is a closed rectangular extension of wire having two rectilinear sides joined by two shorter sides. In general, a series of turns forming a coil consist of a plurality of the rectangular extensions piled in an orderly manner with the sides positioned consistently.

By piling of the coils in an orderly manner, the space occupied by the coil in the core is optimized, therefore interference contact of the turns with the surrounding structure is avoided.

Normally, the two long sides of the rectangular extension of the coil are produced by the axial translations accomplished by the needles dispensing the wire. The rotation movements accomplished by the needles dispense the wire to form the two lateral stretches, which are usually the short sides of the coils. The incremental radial translations pile the turns in different planes of the coil, i.e. at various depths of the slots of the core—a phenomena usually referred to as "stratification" of the turns.

The needles are moved with kinematic solutions driven by rotation of an input motor to accomplish the foregoing movements, like is described in the above mentioned EP 1191672.

In publication EP 318 063 a more limited solution is described. In this case the needles do not move in the radial direction to achieve the stratification.

The different kinematic solutions existing in the art significantly influence both the precision with which the needles are positioned to form the coils, and also the speed with which the needles move to dispense the wire.

In other words, the kinematic solutions are important not only for the precision with which the turns become positioned in the coil, but also for the time required to place all the turns to form the finished coils. This is particularly influenced by the mechanical transmissions, the tolerances, the inertia of the parts of the various kinematic solutions, and also due to the position of these inertias in space.

The winding requirements of coils in brushless cores are particularly focused on positioning of the turns with the maximum precision within the available space of the core of the electric machine. At the same time, higher speed of the movement of the needles is required to increase productivity. The end result is a production of wound cores at high speed with the coils being compact and having a high number of turns.

A further objective is that the movement of the needles needs to be easily and accurately adjusted to adapt the winding parameters to a wide variation of core configurations. In particular, the translation movements, the rotation movements, and the radial displacement of the needles respectively need to cover paths, accomplish angles and travel at slot depths that allow the coil turns to be precisely positioned within specific geometries of the cores.

For the same reason, these movements of the needles need to be accomplished in different stages of a temporal cycle, which is required to wind the coils.

Based on the foregoing description, it is an object of the present invention to provide an improved apparatus for winding electric machine coils.

It is also a particular object of the invention to provide an improved apparatus that causes the needles to accomplish translation movements, rotation movements and radial movements with more accurate positioning of the needles during the winding stages.

It is also an object of the present invention to provide an improved apparatus for accomplishing the translation movements, the rotation movements and the radial movements of the needles at a higher speed to increase the productivity of wound coils.

It is also an object of the present invention to provide an apparatus that has solutions which are easily adjustable for winding different core configurations, whilst maintaining the foregoing advantages of positioning accuracy and high speed movement of the needles.

A further object of the invention is to provide an apparatus that is more simple to manufacture due to the low number of parts, and for the fact that the parts are of simple configuration and can be easily assembled.

SUMMARY OF THE INVENTION

The invention relates to a novel solution having movable members (needles) for dispensing wire to form the wire coils in the winding stage by translating in an axial direction with respect to the core, rotating with respect to the core, and translating in a radial direction with respect to the core.

A first tubular member, which supports at least one wire dispensing member, can translate in the axial direction and rotate with respect to the core. Furthermore, a second tubular member can be assembled coaxially with respect to the first tubular member and can rotate with respect to the first tubular member to radially translate the wire dispensing member in relation to the core.

Means are provided for converting the relative rotation between the first tubular member and the second tubular member to translate the wire dispensing member in the radial direction with respect to the core.

The invention is also applicable in the case of multiple wire dispensing members, which can be supported by the first tubular member to be translated in the axial direction and rotated with respect to the core.

Similarly, the multiple wire dispensing members can be translated in the radial direction with respect to the core by rotating the second tubular member with respect to the first tubular member.

Each of the wire dispensing members can release wire in order to form a coil around a respective pole of the core. In this way, multiple coils can be wound simultaneously.

These and other objects are accomplished by means of the apparatus according to claim 1.

Other characteristics of the invention are indicated in the dependent claims.

Further characteristics of the invention, its nature and various advantages will result more clearly from the enclosed figures and the following detailed description of the preferred embodiments.

BRIEF DESCRIPTION OF THE DRAWINGS

In the enclosed figures:

FIG. 3a is a partial view as seen from directions 3 of FIG. 1 illustrating a lever mechanism. The upper part of the lever mechanism is a view from directions 3'-3? of FIG. 4. In FIG. 3a certain parts of the apparatus of FIG. 1 have been omitted for reasons of clarity.

FIG. 3b is a view similar to the view of FIG. 3a with the lever mechanism of the apparatus positioned differently with respect to the position of FIG. 3a.

FIG. 4 is similar to FIG. 1 of publication EP 1191672, however in the solution of FIG. 4 of the present invention certain modifications are present, as is described in this application.

DETAILED DESCRIPTION OF THE EMBODIMENTS

Figure 1:
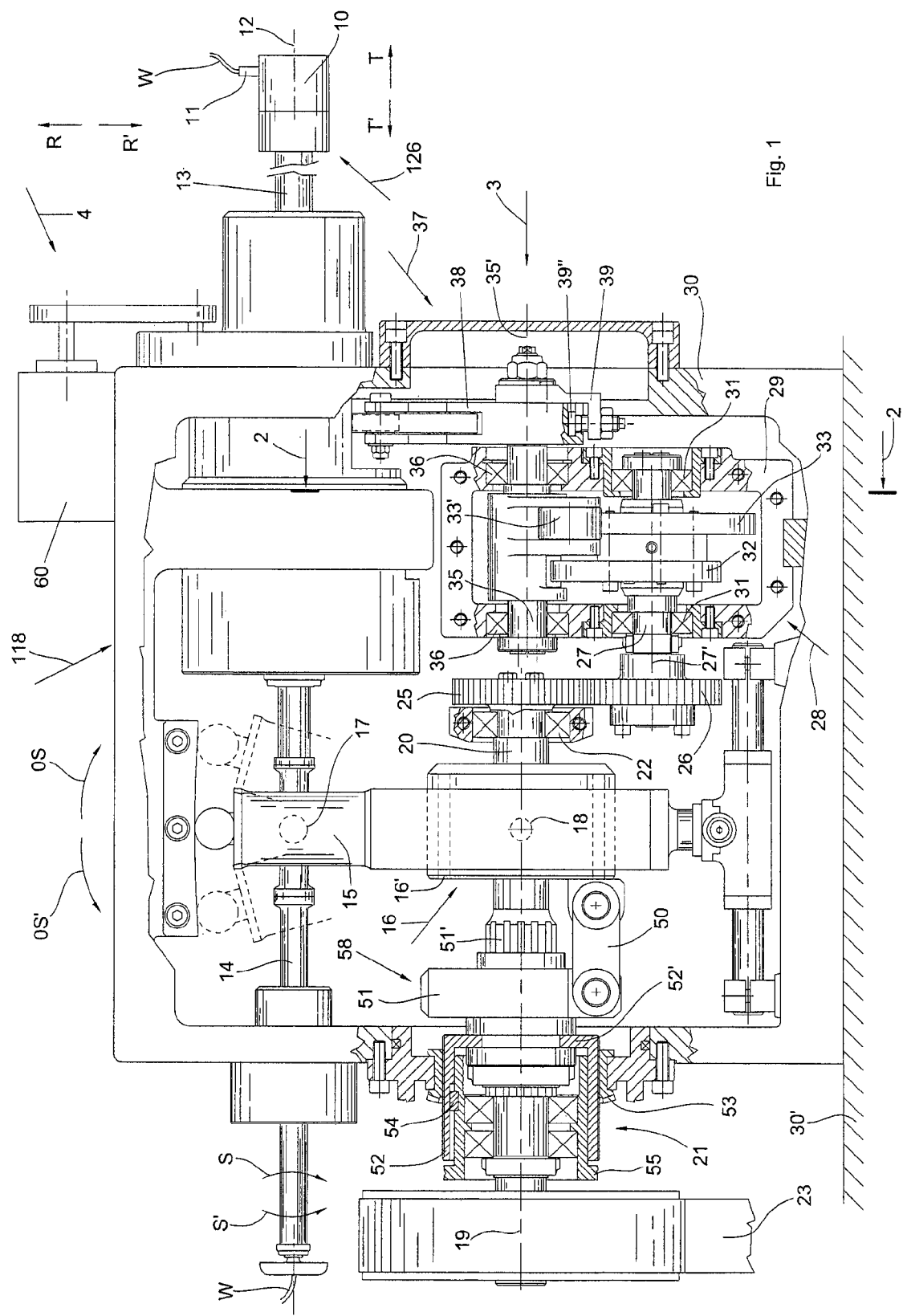
FIG. 1 is a partial section elevation view of the apparatus for moving the wire dispensing members according to the principles of the present invention.

FIG. 1 illustrates a first assembly 10 comprising a needle 11 for dispensing wire W to wind coils around the poles of a core.

The needle 11 translates with reciprocating motion in directions T and T', parallel to longitudinal axis 12. In addition needle 11 rotates with an angular alternative motion in directions S and S' around longitudinal axis 12 and translates with forward and backward radial motion in directions R and R', which are perpendicular to axis 12.

The trajectory accomplished by needle 11 is similar to the trajectory of the needle described in publication EP 1191672. Relative rotations between the external tube 13 and the internal tube 14 in directions S and S' (see also FIG. 4) result in needle 11 translating in the radial directions R and R' for stratification. The relative rotations of external tube 13 and internal tube 14 are generated by motor 60, which transmits rotations in the directions S and S' to internal tube 14 through assembly 118 (see FIGS. 1 and 4) to achieve the stratification displacements in directions R and R'.

Figure 4:
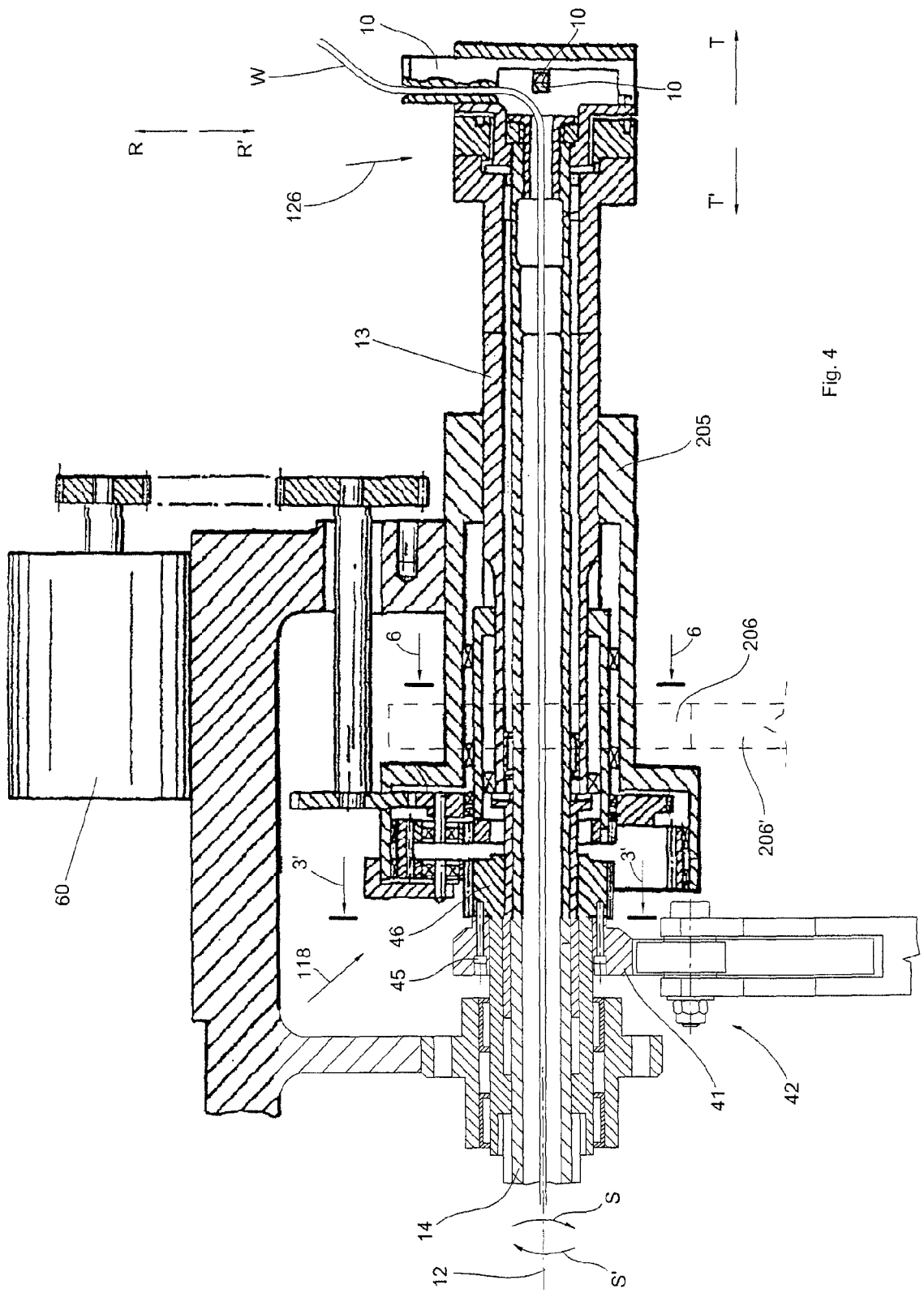
FIG. 4 is a partial section view of the area 4 of FIG. 1.

The principles of this transmission are similar to those described in publication EP 1191672—see FIG. 1 of this publication where motor 164 is similar to motor 60 of the present application, whilst assembly 118 and assembly 126 of FIG. 1 of publication EP 1191672 are respectively similar to assemblies 118 and assembly 126 of FIGS. 1 and 4 of the present application.

With reference to FIGS. 1 and 4 of the present invention, tubes 13 and 14 are assembled integral with each other for translating together in directions T and T', therefore, the motion of translation backwards and forwards in the directions T and T' of needle 11 parallel to longitudinal axis 12 occurs by translating tubes 13 and 14 together in directions T and T'.

This translation is generated by assembly 16 comprising arm 15, which is connected through moveable hinge 17 (shown with dashed line in FIG. 1) to internal tube 14. The ring 16' (shown with dashed line in FIG. 1) is assembled inside arm 15 to be coaxial with axis 19 of shaft 20, and is caused to rotate together with shaft 20 by means of the connection to sleeve 51 through lever 50. In fact, sleeve 51 is integral with shaft 20 in the rotation direction around axis 19, whilst for the adjustment of the translation path in directions T and T' (see the following), sleeve 51 is able to move parallel to axis 19 due to the key and slot connection 51'.

Assembly 16, and thus arm 15, accomplishes the oscillations OS and OS' around axis 18 of the pin present on shaft 20 due to the rotations of ring 16' in arm 15, and the inclined position of arm 15 caused by the position of sleeve 51 along shaft 20. Axis 18 is positioned perpendicular to axis 19 of main shaft 20. The oscillations OS and OS' of arm 15 are transformed into backwards and forward translations in directions T and T' of the internal tube 14, and therefore also into backward and forward translations in directions T and T' of external tube 13.

Assembly 16, arm 15, and hinge 17 are similar to the assembly that generates the translations in publication EP 318 063—see FIG. 1 of this document, however, in the present case hinge 17 is also capable of allowing the rotations of shaft 14 in directions S and S'.

Figure 2:
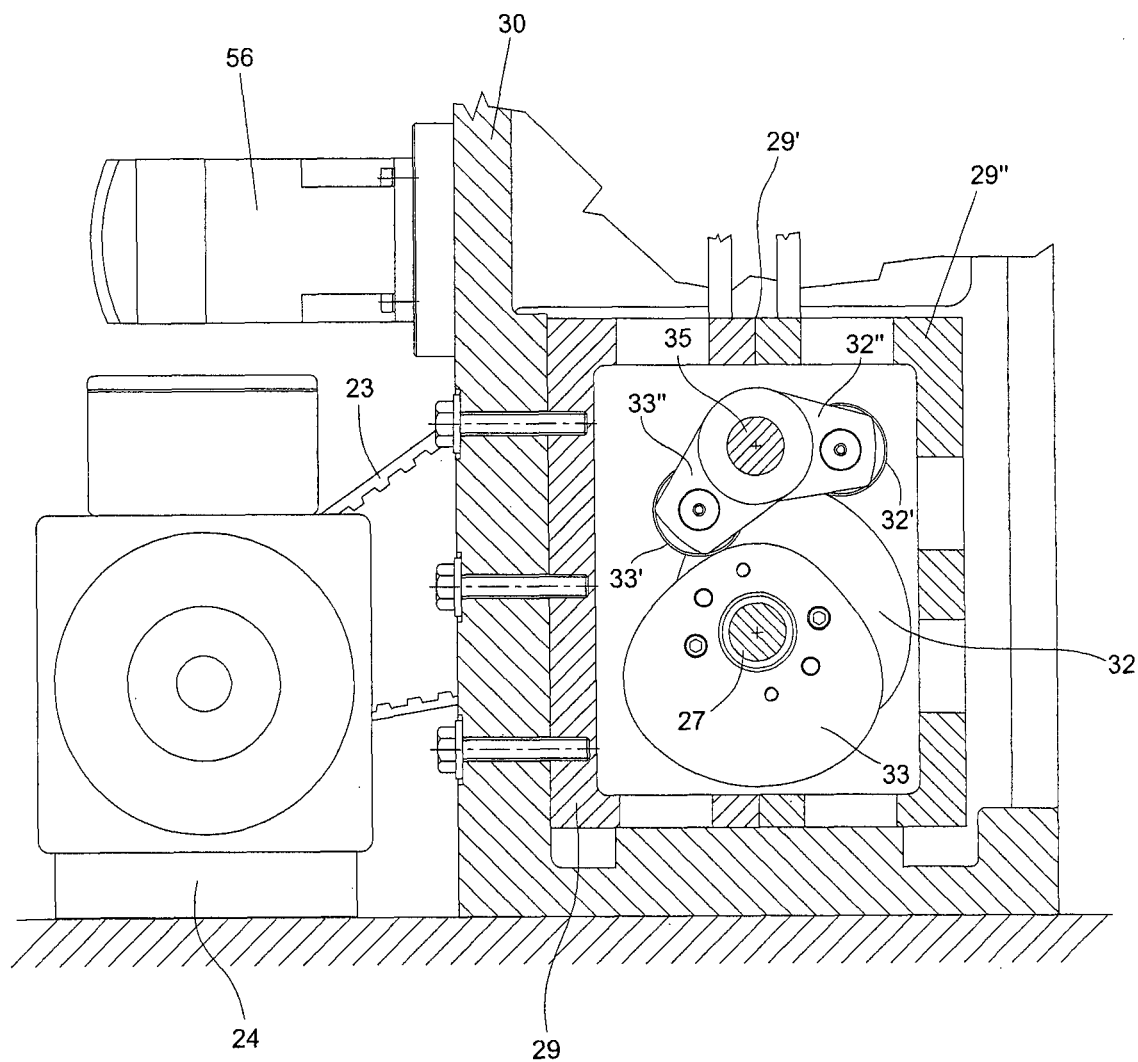
FIG. 2 is a partial section view as seen from directions 2-2 of FIG. 1.

Shaft 20 is assembled on bearings 21 and 22 to rotate around axis 19 and thus generates the oscillations OS and OS' of arm 15. In particular, motor 24 and the belt transmission 23 (see also FIG. 2) rotate shaft 20 around axis 19 to generate the oscillations OS and OS'. Therefore, motor 24 indirectly obtains the forward and backward translations in directions T and T' of the needles like 11. With reference to FIG. 1, gear wheel 25 assembled on the end of shaft 20 engages with the gear wheel 26 assembled on the input shaft 27 of cam assembly 28. As shown in FIGS. 1 and 2, cam assembly 28 comprises a support frame 29 fixed by bolts to the main frame 30 of the apparatus of FIG. 1. The view of assembly 28 in FIG. 1 is obtained by removing lid 29' from the joining surface 29" (see FIG. 2).

With reference to assembly 28, the input shaft 27 is assembled on bearings 31, which in turn are assembled on frame 29. Conjugated cams' 32 and 33 are assembled on input shaft 27 of assembly 28. Rollers 32' and 33', which are assembled on respective arms 32" and 33", are in rolling contact with surfaces of cams 32 and 33, respectively.

With reference to FIG. 2, arms 32" and 33" are assembled on exit shaft 35 of assembly 28. The exit shaft 35 is assembled on bearings 36, which are in turn assembled on frame 29.

Figures 3A, 3B:
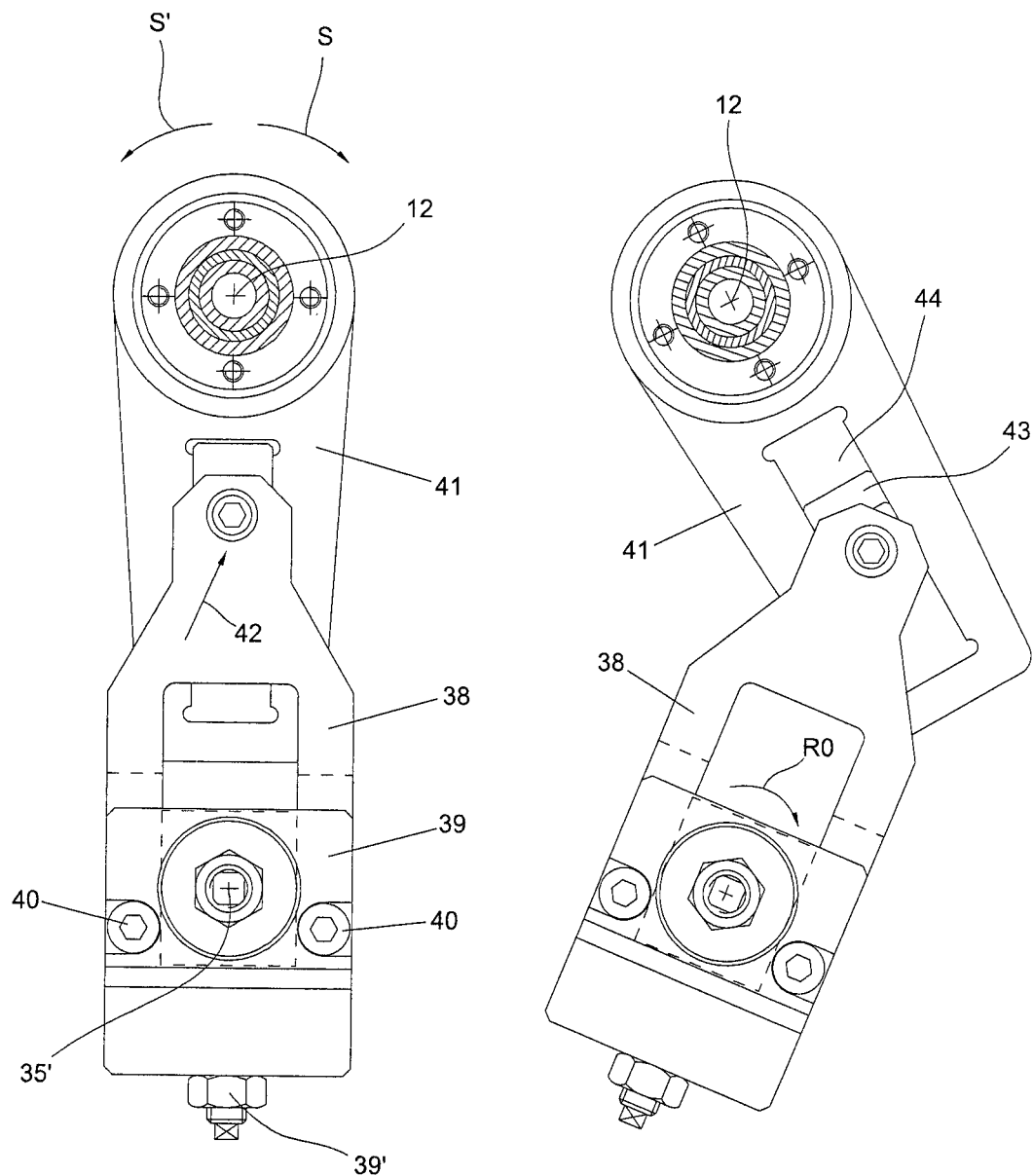

With reference to FIGS. 1, 3a and 3b, an end of lever 38 of lever mechanism 37 is fixed to arm 39, which in turn is assembled on exit shaft 35 of assembly 28. Fixing of lever 38 to arm 39 can be accomplished by means of a flange connection using bolts 40, as shown in FIGS. 3a and 3b.

Lever 38 is connected to lever 41 by means of the moveable hinge 42. Hinge 42 comprises a slide 43 assembled to rotate on the end of lever 38. Slide 43 is able to move in slot 44 of lever 41 during the rotations RO of lever 38 around axis 35' caused by rotation of exit shaft 35 of assembly 28, as shown in FIGS. 3a and 3b.

The end of lever 41 is connected to gear wheel 46 of FIG. 4 to rotate tube 14 in directions S and S'. The connection of lever 41 to gear wheel 46 is achieved by means of a flange using bolts 45, as shown in FIG. 4.

Rotation of cams 32 and 33 obtained by the rotation of shaft 20, as is required to accomplish the winding cycles, obtains rotations S and S' of arm 41 around axis 12. Rotations S and S' are synchronized with the translations in directions T and T' of tubes 13 and 14.

Therefore, assembly 28 by having its own frame 29, where bearings 31 and 36 of the shafts of cams 32 and 33 are supported, can be considered an independent unit that is assembled separately and then bolted to frame 30, as shown in FIG. 2. This solution can facilitate manufacture and assembly of the apparatus of FIG. 1.

As an alternative embodiment, frame 29 can be omitted. In this case, the bearings of shafts 27 and 35 can be assembled on needed supports of main frame 30.

The transmission formed with gear wheels 25 and 26 and the position of assembly 28 locates axis 27' of input shaft 27 and all of assembly 28 near to base 30' of the apparatus. In other words, axis 27' has been displaced on the lower side of shaft 20, whilst tubes 13 and 14 are located on the upper side of shaft 20. In this way, the distance that separates axis 19 of shaft 20 from axis 12 has been reduced, therefore the distance that separates axis 12 from the base 30' of the apparatus has been reduced. This has achieved that the apparatus of FIG. 1 has a low height from base 30' and the moments of force generated by the translation of inertias in directions T and T' with respect to base 30' have been reduced. Therefore, the speed of the apparatus as generated by motor 24 can be increased. At the same time, a higher speed of the synchronization of motor 60 with motor 24 has been increased.

By substituting arm 39 with similar arms, which differently distance hinge 42 from exit shaft 35, it is possible to change the angles of rotations S and S' for winding cores having for example different pole widths. Bolt assembly 39' of an arm 39 is necessary for the adjustment of the distance of hinge 42 because it is able to position the positioning head 39" at different distances. Positioning head 39" is received in a slot of an arm 39 (see FIGS. 1, 3a and 3b) to position lever 38 with respect to the arm 39

To adjust the distance which the needle 11 accomplishes in directions T and T', in other words, to change the translation path of the needle, for example when the length of the poles of the cores changes, the inclination of arm 15 around pin 18 is modified, which requires modifying the inclination of ring 16' with respect to shaft 20 by using assembly 58. To achieve this, lever 50 is hinged at one end to ring 16' of assembly 16, whilst the other end of lever 50 is hinged to sleeve 51. Sleeve 51 can move when required (during adjustments) along shaft 20, i.e. parallel to axis 19.

Cylinder 52 is threaded on the outside, and this thread of cylinder 52 engages the thread present inside gear ring 53, as shown in FIG. 1. By rotating gear ring 53 around axis 19, cylinder 52 translates parallel to axis 19 to displace sleeve 51 by means of the engagement connection 52' of cylinder 52 inside the slot of 51, as shown in FIG. 1.

The key 54 existing between cylinder 52 and support 55 guarantees that cylinder 52 does not rotate, but only translates parallel to axis 19 when arm 15 needs to be inclined. Gear ring 53 can be rotated for predetermined angles by a pinion (not shown) which is rotated by motor 56 (see FIG. 2).

To adjust the path of the needles in directions R and R' for the stratification, programming of motor 60 needs to be changed. The new programming needs to guarantee the synchronization with the translations and rotations generated by motor 24.

Figure 5:
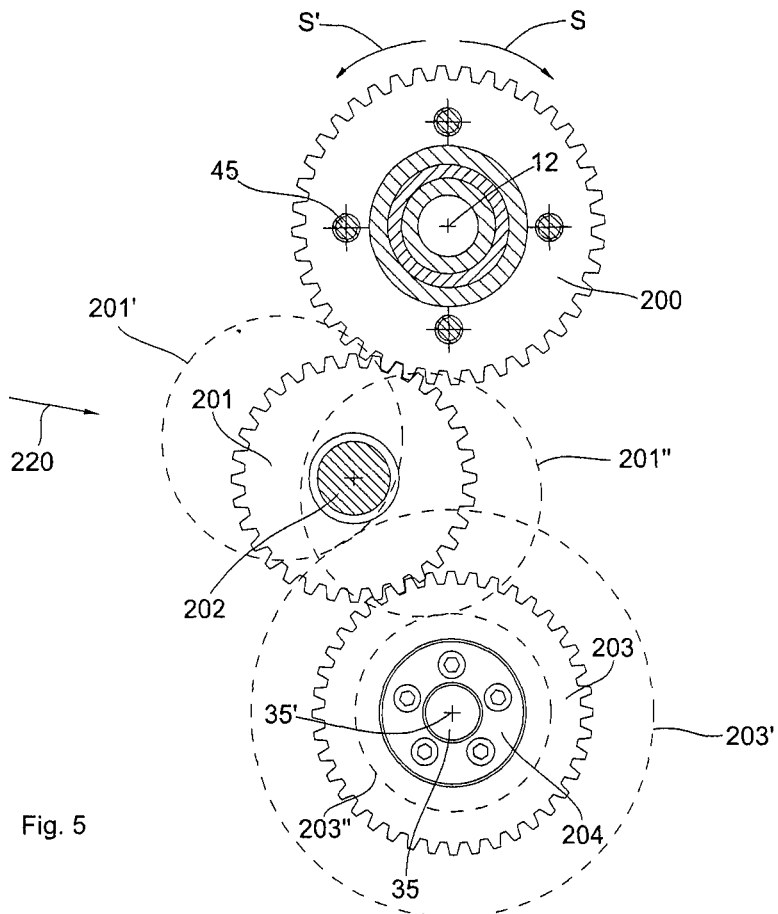
FIG. 5 is a view similar to the view of FIG. 3a, although illustrating a different embodiment of the invention.

FIG. 5 shows an embodiment where levers 41 and 38 of the embodiment of FIG. 3a have been substituted with a gear train 220. More particularly, gear 200 is connected to gear wheel 46 of FIG. 4 to rotate tube 14 in directions S and S'. The connection of gear 200 to gear wheel 46 is achieved by means of a flange abutment using bolts like 45 shown in FIG. 4.

Gear 201 meshes with gear 200 as shown in FIG. 5. Gear 201 is free to rotate (idle) on shaft 202, as is more fully explained with reference to FIG. 6.

Gear 203 is fixed on the end of shaft 35 of cam assembly 28 by means of coupling 204.

Therefore, rotations of shaft 35 deriving from rotation of cams 32 and 33 are transmitted to gear wheel 46 through the gear train 220 consisting of gears 203, 201 and 200

Figure 6:
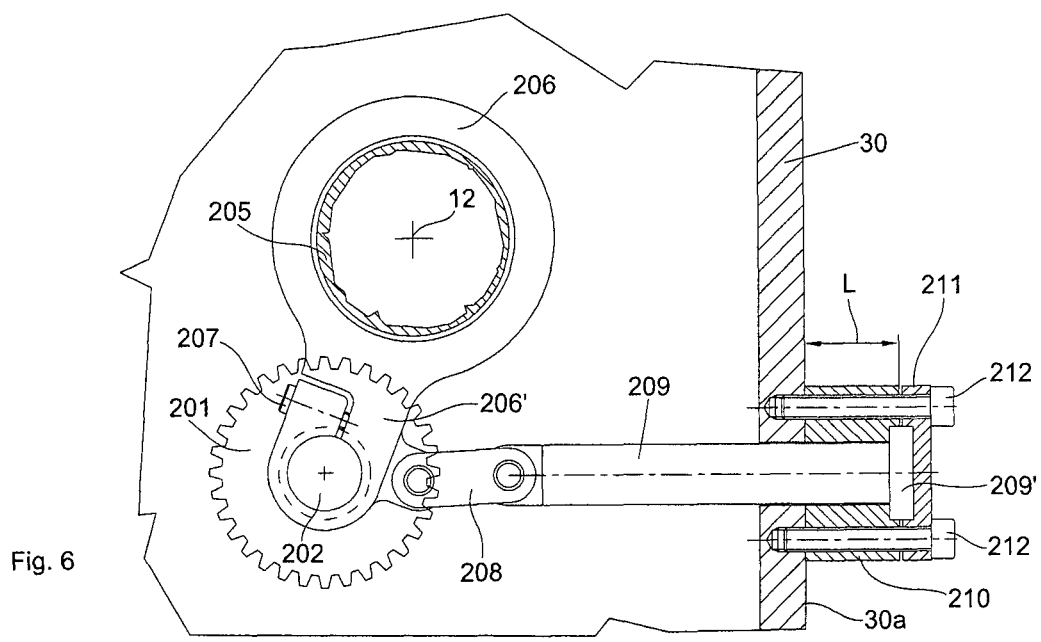
FIG. 6 is a view as seen from directions 6-6 of FIG. 4 in the case of the embodiment of FIG. 5.

With reference to FIG. 6, collar 206, lever 208 and the assembly of shaft 209 are shown. These parts and assembly are only partly shown in FIG. 4 for reasons of clarity. More particularly only collar 206 is shown with dash line representation.

Again with reference to FIG. 6, collar 206 is assembled to rotate on cylinder 205 of FIG. 4 around axis 12. Collar 206 is provided with extending portion 206', where shaft 202 is fixed by means of a clamp connection closed by bolt 202. In this way gear 201 is supported to rotate on shaft 202, which is integral with collar 206.

Lever 208 is hinged to portion 206' and to the end of shaft 209, as shown in FIG. 6. Head 209' of shaft 209 is clamped between cylinder 210 and 211 by means of bolts 212 which are threaded into frame 30, as shown in FIG. 6. By substituting cylinder 210 with other cylinders having a different length L from abutment surface 30a of frame 30, the position of gear wheel 201 can be changed, as shown by the examples of the two positions in dash line 201' and 201".

The position of gear wheel 201 can be changed when substituting gear wheel 203 with other gear wheels for achieving different gear ratios (see dash line representation of substituted gears 35a and 35b), as is required to change to angles of rotation in directions S and S'.

The invention claimed is:

1. An apparatus for moving wire dispensing members used to wind dynamo electric machine coils comprising:
   a frame;
   a first tubular member having a longitudinal axis assembled for longitudinal reciprocation parallel to said longitudinal axis;
   a second tubular member assembled for the longitudinal reciprocation and rotational oscillation together with said first tubular member;
   means for generating the translational reciprocation motion of said first tubular member and second tubular member;
   means for generating the rotational oscillation of said first tubular member and the second tubular member;
   means for generating a relative rotational motion between the first tubular member and the second tubular member for accomplishing a radial motion of the wire dispensing members;
   wherein said means for generating the translational reciprocation motion are assembled on a first shaft and the means for generating the rotational oscillation are supported with support means assembled on the frame and derive rotational motion from the first shaft through a transmission joint.

2. The apparatus of claim 1 wherein the means for generating the translational reciprocation motion comprise an oscillating arm assembled for oscillating around an axis that is perpendicular to the first shaft; the oscillating arm being connected to the second tubular member; and the oscillating arm comprises a rotating member for rotation around the axis of the shaft; and means for adjusting strokes of the translational reciprocation motion being assembled on the first shaft.

3. The apparatus of claim 2 wherein the means for adjusting strokes of the translational reciprocation motion comprise a member for translation along the first shaft.

4. The apparatus of claim 2 wherein the rotating member for rotation around the axis of the shaft is rotated by a member for translation along the first shaft of the means for adjusting strokes of the translational reciprocation motion.

5. The apparatus of claim 2 wherein the translational reciprocation motion stroke is adjusted by changing the inclination of the rotating member with respect to the axis of the first shaft.

6. The apparatus of claim 1 wherein the support means comprise a second frame member.

7. The apparatus of claim 1 wherein the means for generating the rotational oscillation comprise conjugated cams and engagement members for engaging and following the profile of the cams.

8. The apparatus of claim 7 further comprising a third shaft rotated by the engagement members for rotating a lever mechanism connected to one of the tubular members.

9. The apparatus of claim 7 further comprising a third shaft rotated by the engagement members for rotating a gear train wherein, a gear of the gear train is connected to one of the tubular members.

10. The apparatus of claim 9 wherein the gear train comprises a first gear assembled on the third shaft, a second gear assembled idle on a fourth shaft, and a third gear connected to one of the tubular members.

11. The apparatus of claim 10 wherein the position of the fourth shaft is moved with respect to the frame to adjust the angular stroke of the rotational oscillation.

12. The apparatus of claim 8 wherein the lever mechanism comprises two levers connected together by means of a slide provided with a hinge connection.

13. The apparatus of claim 12 wherein the distance of the hinge connection from the third shaft is changed to adjust the angle of the rotational oscillation.

14. The apparatus of claim 1 further comprising a second shaft rotated by the transmission joint for rotating the means for generating the rotational oscillation.

15. The apparatus of claim 14 wherein the second shaft is positioned out of alignment with respect to the first shaft and on one side of the first shaft that is opposite to a second side of the first shaft where the first tubular member and the second tubular member are positioned.

* * * * *